Aug. 4, 1925.

H. I. McDUFFIE

AUTOMOBILE JACK

Filed Aug. 25, 1924

1,548,326

Inventor
H. I. McDuffie
By C. A. Snow & Co.
Attorneys

Patented Aug. 4, 1925.

1,548,326

UNITED STATES PATENT OFFICE.

HENRY I. McDUFFIE, OF CHARLOTTE, NORTH CAROLINA.

AUTOMOBILE JACK.

Application filed August 25, 1924. Serial No. 734,103.

*To all whom it may concern:*

Be it known that I, HENRY I. McDUFFIE, a citizen of the United States, residing at Charlotte, in the county of Mecklenburg and State of North Carolina, have invented a new and useful Automobile Jack, of which the following is a specification.

This invention relates to automobile jacks and the object thereof is to provide a device of this character which may be quickly applied to an automobile and requires no racking up, the device being placed in operative position and then the car moved forward to cause the jack to support the wheel to be jacked up.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 3:
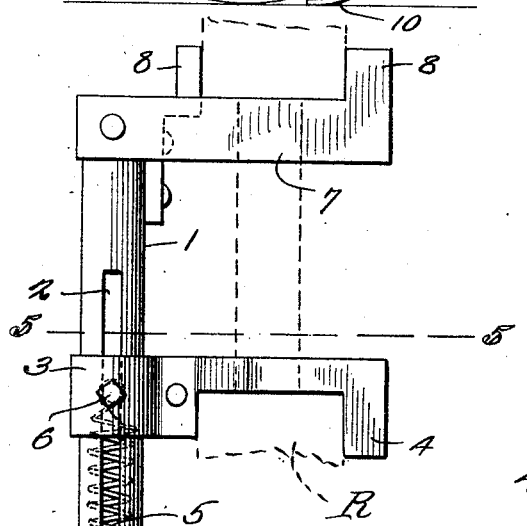
Fig. 3 is a end elevation on a larger scale, parts of the wheel being shown broken out to illustrate the application of the invention.
Figure 4:
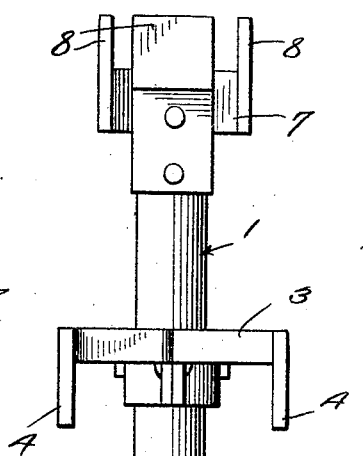
Fig. 4 is a side elevation of the jack detached.
Figure 5:
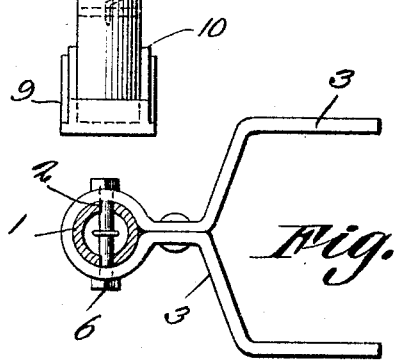
Fig. 5 is a plan sectional view taken on the line 5—5 of Fig. 3.

In the embodiment illustrated the jack constituting this invention comprises a main barrel 1 slotted longitudinally as shown at 2 and on which is mounted to slide a laterally extending arm 3 having spaced depending clamping fingers 4 which are designed to straddle the rim R of the wheel when the jack is applied and which is held engaged with said rim by means of a coiled spring 5 mounted in the barrel 1 below the arm 3 and connected so as to exert its tension for holding said arm engaged with said rim. A bolt 6 extends transversely through the inner end of the arm 3 and through the slots 2 in the barrel 1 as is shown clearly in Fig. 3 and with which is connected one end of the coiled spring 5.

The upper end of the barrel 1 has fixed thereto a laterally extending bracket or arm 7 provided with upstanding fingers 8 which are designed to engage a hub flange of the wheel and which takes the weight of the car.

Figure 1:
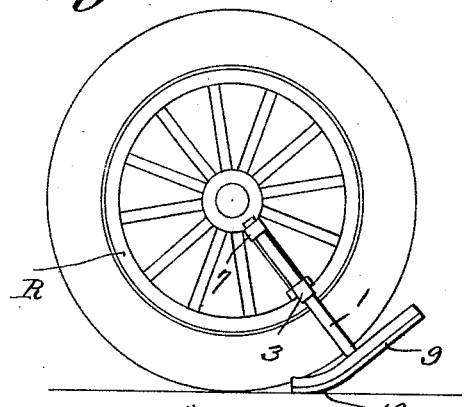
Figure 1 represents a side elevation of a vehicle wheel with this improved jack shown in the position in which it is placed before the wheel is lifted thereby.
Figure 2:
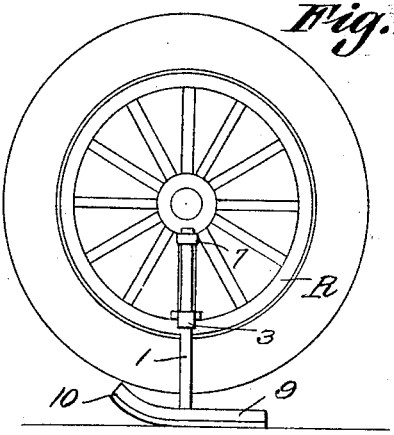
Fig. 2 is a view similar to Fig. 1 showing the wheel lifted.

A foot 9 is secured to the lower end of the main barrel 1 and has one end upturned and curved as shown at 10 to facilitate riding up of the car on the jack as is shown clearly in Figs. 1 and 2. The length of barrel 1 is greater than the radius of the wheel in connection with which the jack is to be used so that when the wheel rides up on the jack the perimeter thereof will be spaced above the surface of the ground to provide for the ready removal of the tire.

In the use of this jack the bracket 7 is positioned so that the fingers 8 thereof catch under the hub flanges of the wheel while the arm 3 straddles the spoke and catches on the rim of the wheel being held in operative position by the pull spring 5 and holds the jack engaged with the wheel. After the jack is positioned as shown in Fig. 1 the car is started and rolled up on the jack into the position shown in Fig. 2 in which position the wheel is elevated out of contact with the ground and supported so that the tire may be removed.

From the above description it will be obvious that a jack constructed as herein shown and described may be quickly applied and removed without necessitating any rack or levers being used such as is ordinarily used in devices of this character thereby greatly simplifying the operation and avoiding soiling of the driver's clothes and the exertion of unnecessary effort.

The jack is compact and may be readily stored in a comparatively small space and used whenever found necessary.

I claim:—

1. A jack of the class described comprising a supporting post with a foot at one end, and a laterally extending arm at the other end provided with hub engaging fingers, and a rim engaging member carried by said post and yieldably held in operative position whereby the jack is held engaged with the wheel.

2. A jack of the class described comprising a supporting post with a foot at one end, and a laterally extending arm at the other end provided with hub engaging fingers, and a spring pressed rim engaging member carried by said post to hold said arm engaged with said rim.

3. A jack of the class described comprising a supporting post with a foot carried by one end to engage a supporting surface, and a laterally extending arm fixed to the upper end of said post and having upstanding fingers to engage the flange of a wheel hub, an arm slidable vertically on said post and having depending rim engaging elements, and resilient means for holding said arms in operative position.

In testimony that I claim the foregoing as my own, I have hereto affixed my signature in the presence of two witnesses.

HENRY I. McDUFFIE.

Witnesses:
G. B. GRAHAM,
EARLE D. WHITTON.